United States Patent
Imai et al.

(10) Patent No.: US 6,842,681 B2
(45) Date of Patent: Jan. 11, 2005

(54) TORQUE DISTRIBUTION CONTROL DEVICE FOR FOUR-WHEEL DRIVE VEHICLE

(75) Inventors: Fukami Imai, Kariya (JP); Tatsuya Inagaki, Kariya (JP); Hisaaki Wakao, Kariya (JP); Kiyoshige Kato, Aichi-ken (JP); Satomi Ito, Toyota (JP)

(73) Assignee: Toyoda Koki Kabushiki Kaisha, Kariya ( * ) Notice: Subject to any disclaimer, the term of this patent is extended or adjusted under 35 U.S.C. 154(b) by 0 days.

(21) Appl. No.: 10/420,843

(22) Filed: Apr. 23, 2003

(65) Prior Publication Data

US 2003/0226702 A1 Dec. 11, 2003

(30) Foreign Application Priority Data

| Apr. 23, 2002 | (JP) | ........................... 2002-120774 |
| Apr. 23, 2002 | (JP) | ........................... 2002-120786 |
| Apr. 24, 2002 | (JP) | ........................... 2002-121868 |
| Apr. 24, 2002 | (JP) | ........................... 2002-122893 |

(51) Int. Cl.[7] ............................................. G06F 7/00
(52) U.S. Cl. ............................ 701/69; 701/81; 701/87; 180/197
(58) Field of Search ............................ 701/69, 76, 81, 701/87; 180/197, 247

(56) References Cited

U.S. PATENT DOCUMENTS 5,170,343 A * 12/1992 Matsuda ........................ 700/79

FOREIGN PATENT DOCUMENTS

| JP | 6-72171 | 3/1994 |
| JP | 6-289039 | 10/1994 |
| JP | 2001-277883 | 10/2001 |

* cited by examiner

Primary Examiner—Gertrude A. Jeanglaude
(74) Attorney, Agent, or Firm—Oblon, Spivak, McClelland, Maier & Neustadt, P.C.

(57) ABSTRACT

A torque distribution control device for a four-wheel drive vehicle has a torque distribution device for distributing the drive power transmitted from an engine to either of the front wheels or the rear wheels as prime drive wheels, to other wheels as sub-drive wheels. The control device judges whether or not an abnormality is involved in wheel speed signals which are input from wheel speed sensors associated respectively with the front and rear wheels. A normal-state method of calculating a command torque which is applied to the torque distribution device to vary the drive power transmitted to the sub-drive wheels, is then altered to an abnormal-state method of calculating the command torque based on data which does not include one wheel speed signal involving the abnormality when the same occurs with one of the wheel speed signals, whereby the vehicle is enabled to continue the four-wheel drive even when the abnormality occurs.

9 Claims, 10 Drawing Sheets

TORQUE DISTRIBUTION CONTROL DEVICE FOR FOUR-WHEEL DRIVE VEHICLE

INCORPORATION BY REFERENCE

This application is based on and claims priority under 35 U.S.C. sctn. 119 with respect to Japanese Applications No. 2002-120774 and No. 2002-120786 both filed on Apr. 23, 2002, and No. 2002-121868 and No. 2002-122893 both filed on Apr. 24, 2002, the entire contents of which are incorporated herein by reference.

BACKGROUND OF THE INVENTION

1. Field of the Invention

The present invention relates to a torque distribution control device for a four-wheel drive vehicle and more particularly, to a control function for continuing the four-wheel drive operation to secure the drive-through capability of the vehicle in the event that an abnormality occurs.

2. Discussion of the Related Art

Heretofore, a torque distribution control device for a four-wheel drive vehicle has been known, in which a torque distribution device is provided for distributing the drive power transmitted from an engine to prime drive wheels, to sub-drive wheels. In the control device, an abnormality may happen with the wheel speed signals. The cause of such an abnormality may be the fault of any of wheel speed sensors for four front and rear wheels, the breaking or short circuit of signal wires for the wheel speed sensors or the like.

In the event of the abnormality occurring, the torque distribution control device usually switches over a command value to the torque distribution device to zero (0), thereby diminishing the distribution torque to the sub-drive wheels to zero (0). That is, in the event of an abnormality occurring, the control device changes the drive mode from four-wheel drive to two-wheel drive. This comes from the conclusion that continuing four-wheel drive control based on the wheel speed signals which are in short of reliability could influence on the stability in steering the vehicle.

However, where changing the drive mode to the two-wheel drive is carried out in the event of an abnormality occurring as mentioned above, it may occur that the vehicle in the two-wheel drive mode cannot run in such a situation that the four-wheel drive is needed like, for example, a heavily snowy road. This disadvantageously makes it impossible to secure a drive-through capability of the vehicle.

Further, where an abnormality occurs with the wheel speed signal for one wheel of either the front wheels or the rear wheels, it has been practice that the command torque to the torque distribution device is reduced to zero thereby to drive the prime drive wheels only. As a result, when the abnormality arises on the wheel speed signal for only one wheel of those signals for the four wheels, the vehicle is caused to operate in the two-wheel drive mode. Thus, when the abnormality arises on the wheel speed signal for one wheel with the vehicle running on a slippery road such as snowy road, the four-wheel drive vehicle is operated as if it is a two-wheel drive vehicle, whereby it becomes easier for the vehicle to slip.

Furthermore, a so-called tight-cornering phenomenon is known as the phenomenon which occurs on a four-wheel drive vehicle when it runs a small-radius corner while the rotational difference between the front and rear wheels is restrained. In the phenomenon, the vehicle is brought into the state that brake forces are applied to the front and rear wheels. In particular, the tight-cornering phenomenon causes the four-wheel drive vehicle to be liable to suffer the engine stall while the four-wheel drive vehicle turns along a small-radius corner.

To obviate this problem, in a torque distribution device for a four-wheel drive vehicle, the wheel speeds of the four front and rear wheels are detected, and the steering angle is calculated, the rotational speed difference between the front wheels and the rear wheels is detected, or the slip of the wheels located outside with respect to the turning center are calculated based on the wheel speed data. And, when the steering angle is smaller than a predetermined angle, when the rotational speed difference is larger than a predetermined value, or when the wheels located outside with respect to the turning center suffer slip, it is judged that the tight-cornering phenomenon is to occur, and the transmission torque to sub-drive wheels is controlled to zero or to a minimum value in order to prevent the tight-cornering phenomenon from occurring.

However, it may happen that an abnormality arises on wheel speed sensors or signal wires therefor, and the wheel speed data indicates wrong values in the abnormal state. This may allow the judgment of the tight-cornering phenomenon to be performed based on the wrong wheel speed data. Thus, the judgment of the tight-cornering phenomenon becomes inaccurate or unreliable, and hunting takes place in the torque transmission to the sub-drive wheels. This disadvantageously may result in making the movement of the vehicle unstable.

SUMMARY OF THE INVENTION

Accordingly, it is a primary object of the present invention to provide a torque distribution control device for a four-wheel drive vehicle capable of securing the drive-through capability of the vehicle or maintaining the stability in motion of the vehicle even when an abnormality arises on any of wheel speed signals from wheel speed sensors respectively associated with four front and rear wheels.

Briefly, according to the present invention, there is provided a torque distribution control device for a four-wheel drive vehicle having a torque distribution device for distributing the drive power transmitted from an engine to prime drive wheels, to sub-drive wheels. The control device comprises abnormality judgment means for judging whether or not an abnormality is involved in wheel speed signals relating to the prime drive wheels and the sub-drive wheels; and means for altering a normal-state method of calculating a command torque which is applied to the torque distribution device to vary the drive power transmitted to the sub-drive wheels, to an abnormal-state method of calculating the command torque based on data which does not include one wheel speed signal involving the abnormality when the same occurs with one of the wheel speed signals, whereby the vehicle is enabled to continue the four-wheel drive even when the abnormality occurs.

With this configuration, the vehicle can be operated in the four-wheel drive mode even when an abnormality arises on any of the wheel speed signals, so that the capability of driving through in such a situation that the four-wheel drive is needed like, for example, a heavily snowy road is secured in the vehicle and that the stability in steering can also be maintained.

In one specific form of the torque distribution control, when it is judged that an abnormality arises on any one of the wheel speed signals, the command torque is determined based on a throttle opening degree only. Thus, the distribution torque is set without employing the vehicle speed and the average wheel speed difference obtained based on the wheel speed signals which are in short of reliability. Accordingly, it advantageously becomes possible to maintain the drive-through capability without harming the safety capability of the vehicle.

In another specific form of the torque distribution control, when it is judged that an abnormality arises on one wheel speed signal associated with one wheel of either front wheels or rear wheels, the abnormal wheel speed signal is replaced by another wheel speed signal associated with the other wheel which is located opposite to the one wheel of which the abnormality arises, and the calculation of the command torque is carried out using the replaced wheel speed signal in substitution for the abnormal wheel speed signal. Thus, it becomes possible to calculate the command torque and to continue the running of the vehicle in the four-wheel drive mode even when an abnormality arises on any one of the wheel speed signals.

In a still another specific form of the torque distribution control, when it is judged that an abnormality arises on any one of the wheel speed signals, the judgment of the tight-cornering phenomenon is prohibited. Thus, it does not take place that abnormal wheel speed signals are used to execute wrong judgment of the tight-cornering phenomenon. Accordingly, hunting does not occur in the toque transmitted to the sub-driven wheels, and the vehicle can run stably in the four-wheel drive mode even in the event of the abnormality occurring.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 10:
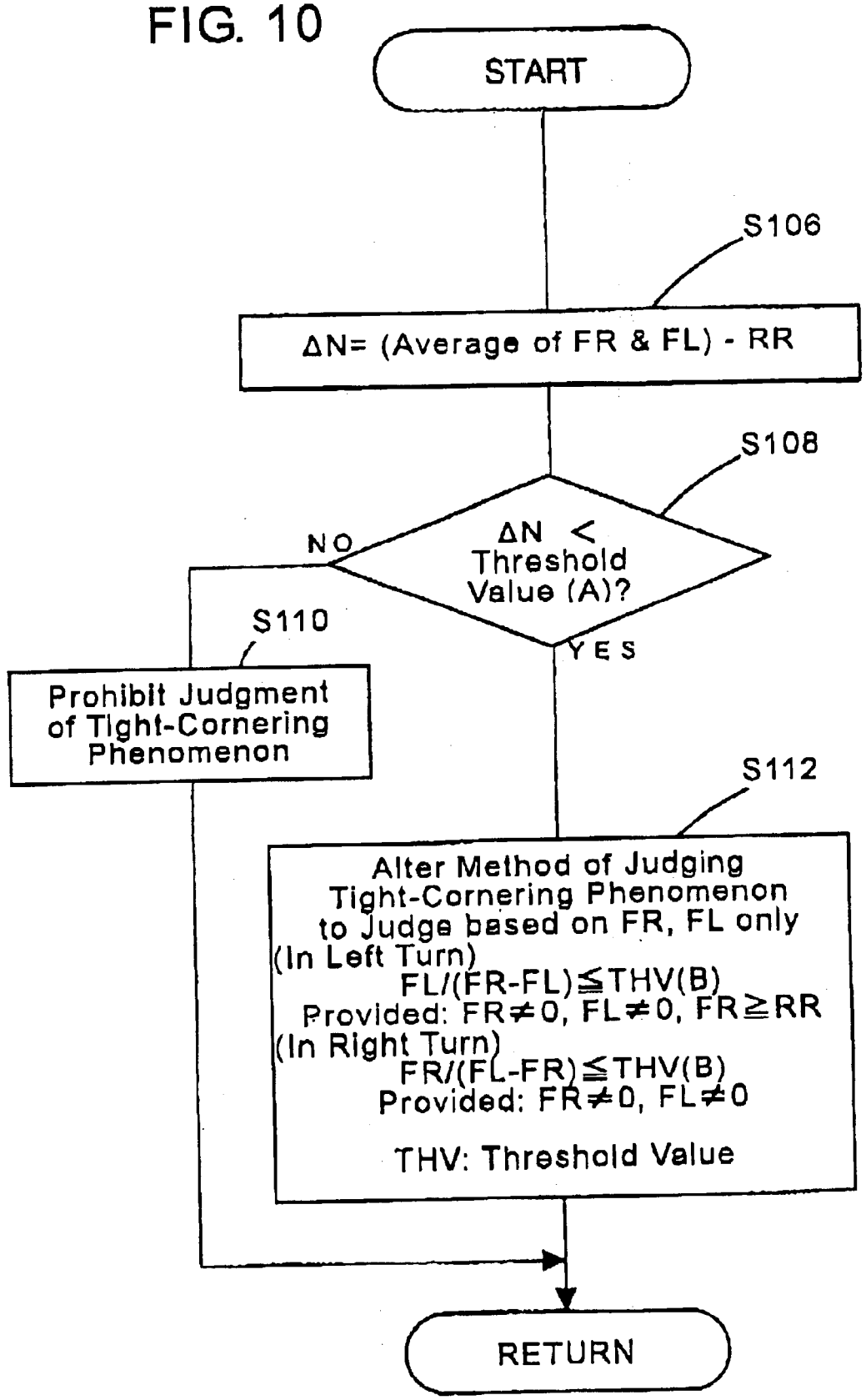
Figure 11:
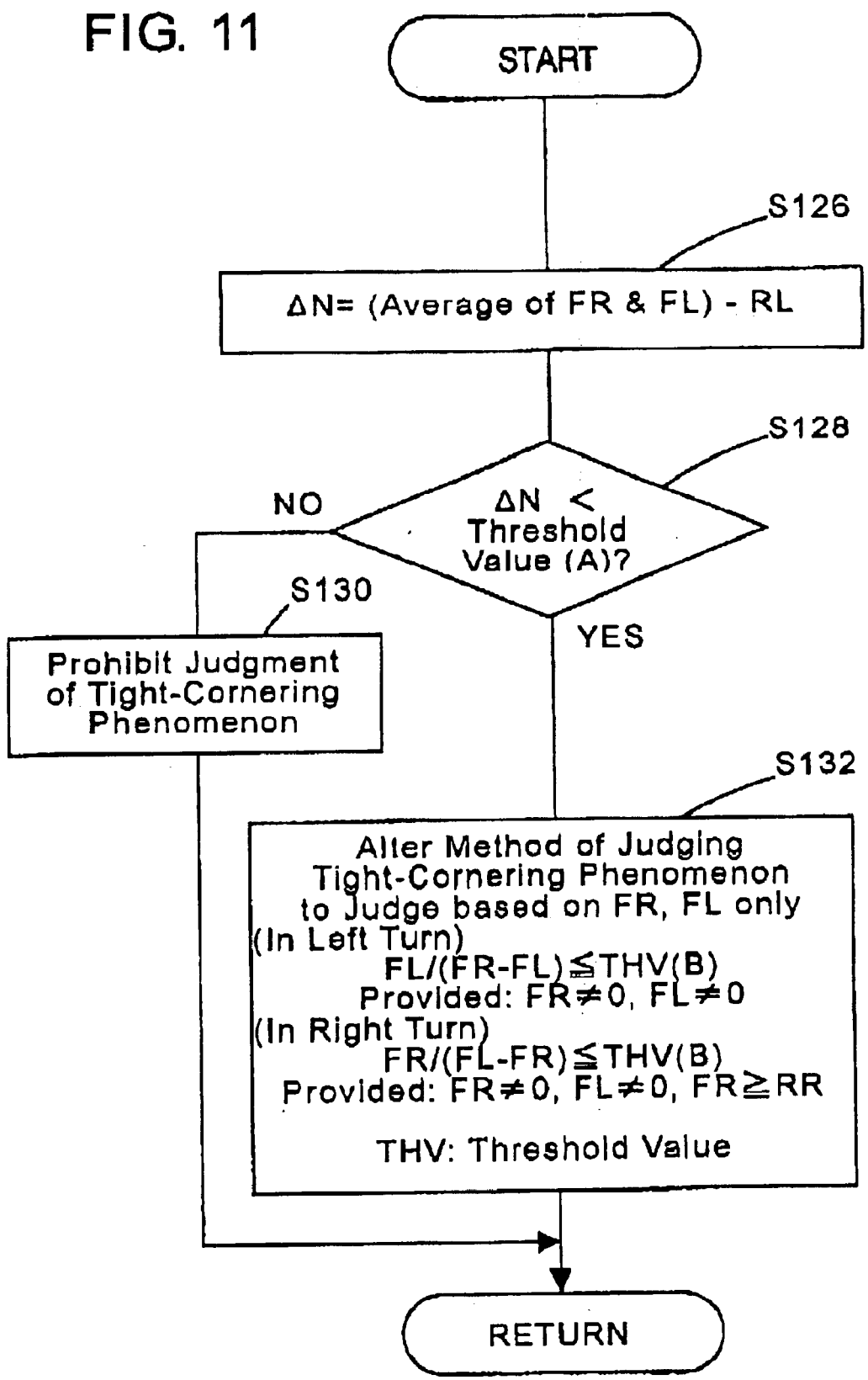

FIG. 10 is a flow chart showing a part of a control processing for prohibiting the tight corner braking phenomenon executed by the electronic control circuit in the fourth embodiment of the present invention; and FIG. 11 is a flow chart showing the remaining part of the control processing for prohibiting the tight corner braking phenomenon executed by the electronic control circuit in the fourth embodiment.

DETAILED DESCRIPTION OF THE PREFERRED EMBODIMENTS

Figure 1:
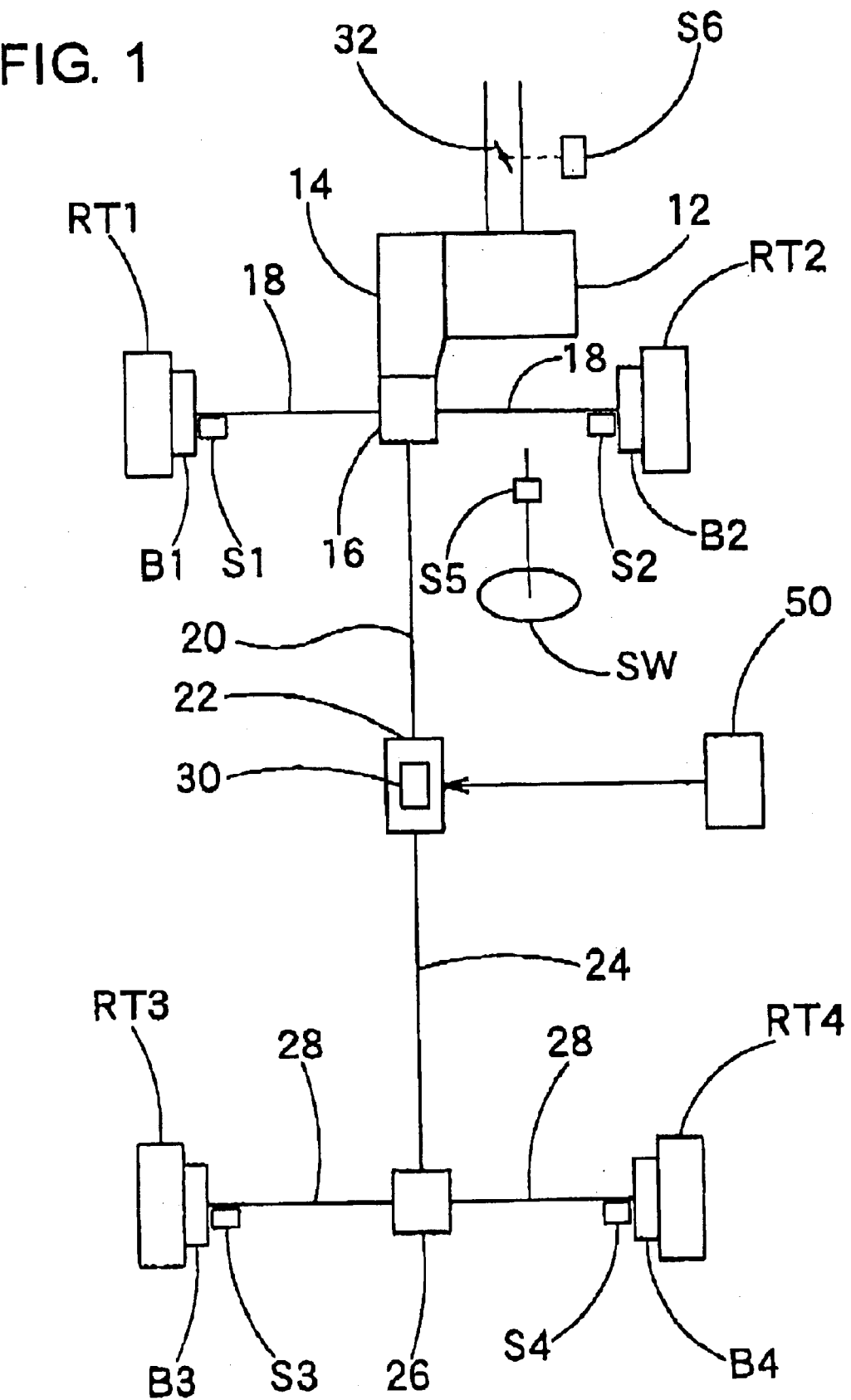
FIG. 1 is a schematic view of a four-wheel drive vehicle incorporating a torque distribution control device according to first to fourth embodiments of the present invention.

First of all, a basic construction common to first to fourth embodiments will be described with reference to FIGS. 1 and 2. In FIG. 1, a transaxle 14 is assembled at an output side of an engine 12. The transaxle 14 integrally incorporates a transmission, transfer and a front differential 16 therein. The transaxle 14 outputs the drive power of the engine 12 through the front differential 16 to axle shafts 18, 18 to drive right and left front wheels RT1, RT2 and further to a first propeller shaft 20. The first propeller shaft 20 is connected to a second propeller shaft 24 through a torque distribution device 22. When the torque distribution device 22 connects the first and second propeller shafts 20, 24 in such a manner that it is able to perform torque transmission, the drive power is transmitted to the rear differential 26 and is output from the same to the axle shafts 28, 28 to drive right and left rear wheels RT3, RT4.

The torque distribution device 22 is provided with a clutch discs 30 for transmitting the drive power from the first propeller shaft 20 to the second propeller shaft 24 and a pressuring mechanism (not shown) for applying pressuring force on the clutch discs 30. The pressuring mechanism applies on the clutch discs 30 the pressuring force which depends on a command signal or value from an electronic control circuit 50. For example, when the command value is to increase the torque distribution from the first propeller shaft 20 to the second propeller shaft 24, the engagement force on the clutch discs 30 is enforced, so that the drive torque of the first propeller shaft 20 is transmitted to the second propeller shaft 24 partly or wholly. On the contrary, when the command value is not to perform the torque transmission from the first propeller shaft 20 to the second propeller shaft 24, the clutch discs 30 are disengaged, so that the drive torque of the first propeller shaft 20 is not transmitted to the second propeller shaft 24. In this manner, the torque distribution device 22 varies the connection force of the clutch discs 30 in dependence upon the magnitude of the command value, so that it is able to adjust the transmission torque from the first propeller shaft 20 to the second propeller shaft 24.

The prime drive wheels RT1, RT2 and sub-drive wheels RT3, RT4 are provided with brakes B1, B2, B3, B4 and wheel speed sensors S1, S2, S3, S4 for detecting wheel speeds, respectively. The wheel speed sensors S1, S2, S3, S4 also operate as wheel speed sensors for an ABS (Anti-lock Brake System) for controlling the brakes B1, B2, B3, B4 independently of each other. A steering column which is connected to a steering wheel or handle SW for manipulating a steering system of the vehicle, is provided with thereon a steering angle sensor S5 for detecting the steering angle of the steering handle SW. Further, a throttle body in an intake system for the engine 12 is provided with a throttle opening sensor S6 for detecting the opening degree of a throttle valve 32, which adjusts the intake volume in dependence upon the stepping-on measurement of an accel pedal (not shown).

Figure 2:
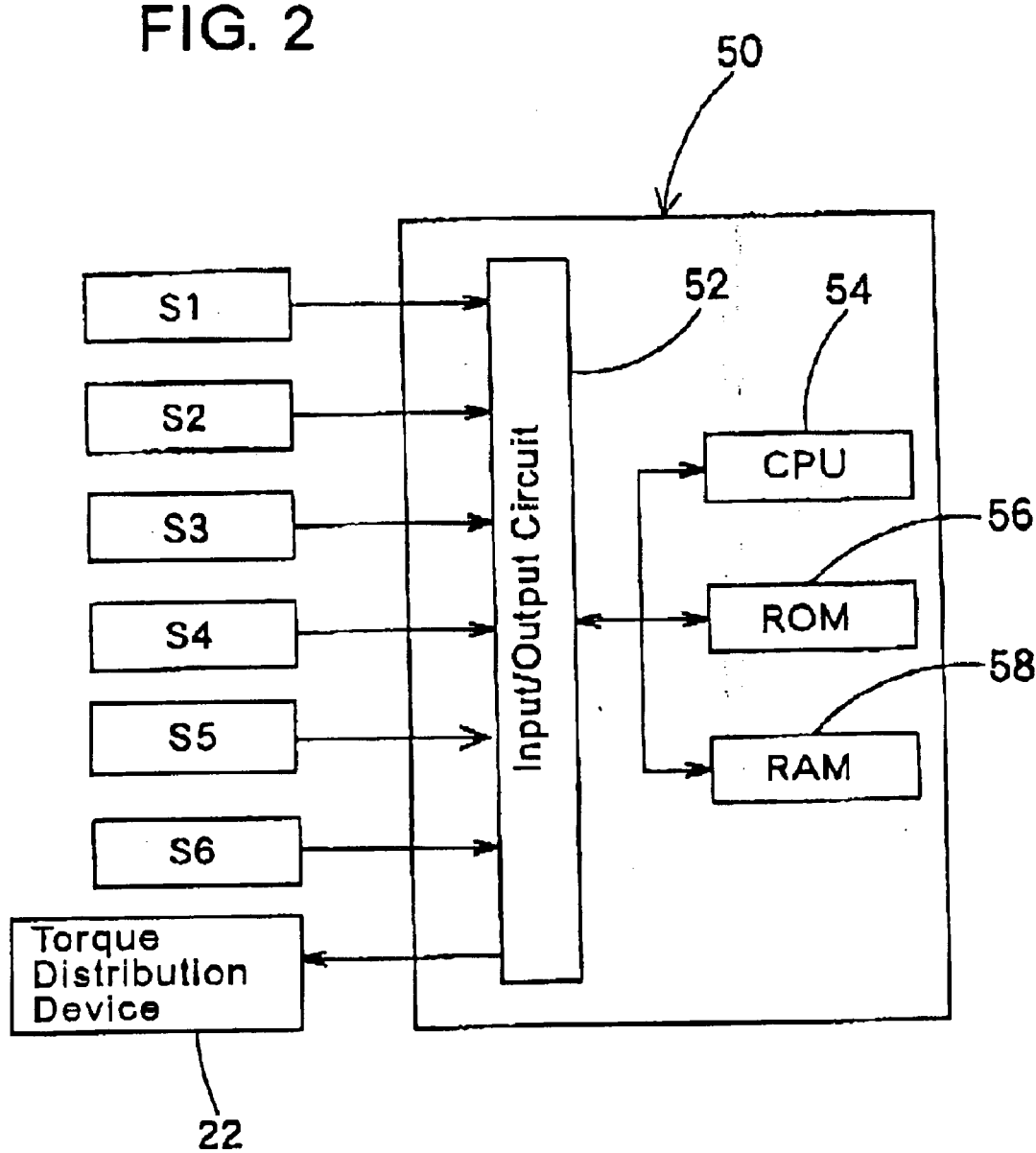
FIG. 2 is a block diagram of an electronic control circuit used commonly in the first to fourth embodiments.

Referring now to FIG. 2, an electronic control circuit 50 is shown connected to the wheel speed sensors S1, S2, S3, S4, the steering angle sensor S5, the throttle opening sensor S6 and further to the torque distribution device 22. The electronic control circuit 50 is composed of a CPU 54 for executing various kinds of operation processing to control the torque distribution device 22, a ROM 56 for storing control programs indicative of operation processing steps to be executed by the CPU 54, a RAM 58 for reading out and writing in data as required during the execution by the CPU 54 of the operation processing, and an input/output circuit 52 for inputting thereinto the wheel speed signals, the steering angle signal and the throttle opening signal from the wheel speed sensors S1, S2, S3, S4, the steering angle sensor S5 and the throttle opening sensor S6 and for outputting the command value as a result of the operations executed by the CPU 54, to the torque distribution device 22.

(First Embodiment)

Figure 3:
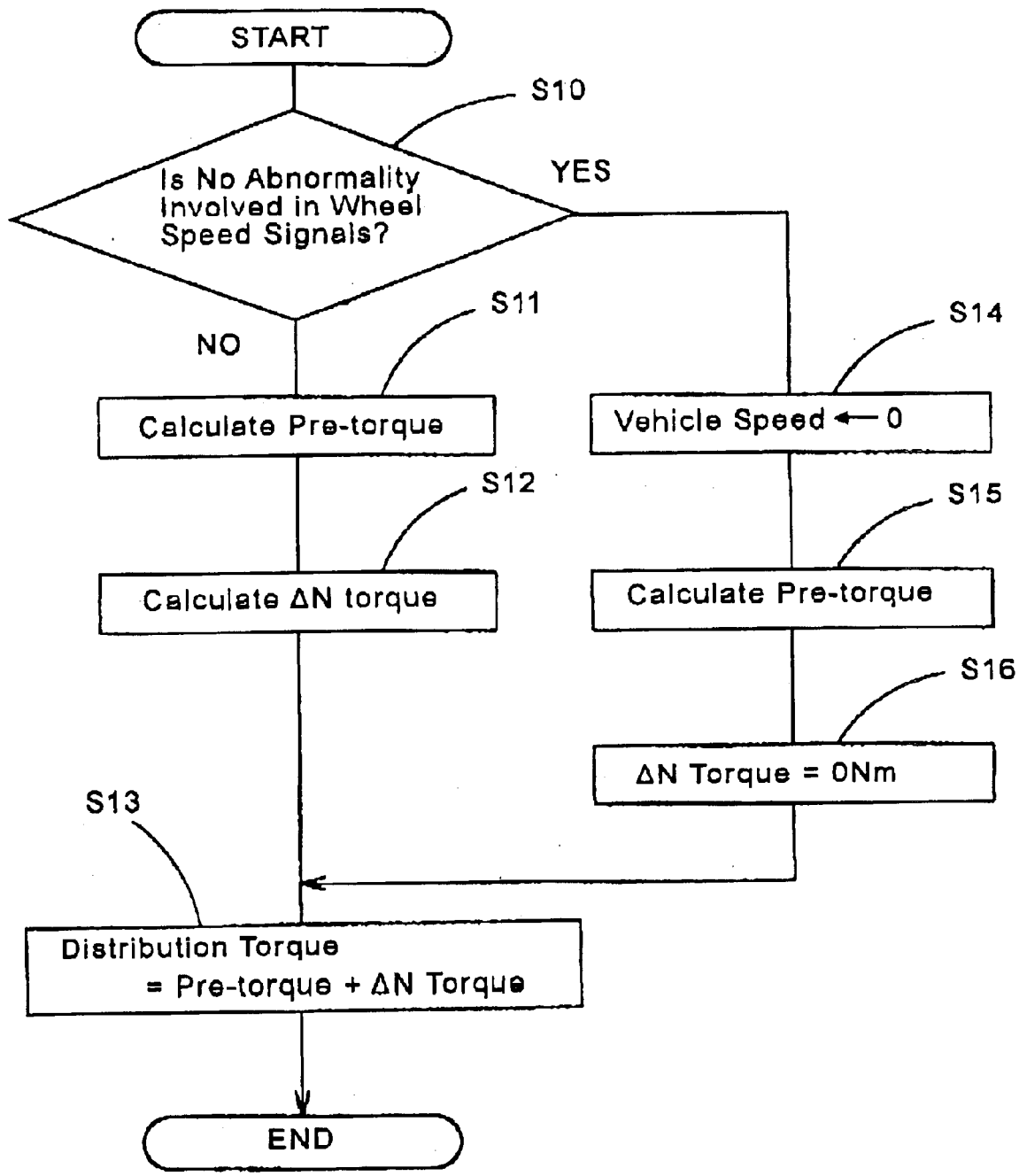
FIG. 3 is a flow chart showing one specific form of the torque distribution control executed by the electronic control circuit in the first embodiment of the present invention.

The first embodiment according to the present invention includes a basic configuration as constructed above of the torque distribution device 22. The electronic control circuit 50 executes the following control operation for the torque distribution device 22, which operation will be described hereinafter with reference to FIG. 3.

The CPU 54 judges based on the wheel speed signals from the wheel speed sensors S1, S2, S3, S4 whether or not an abnormality is involved in each of the wheel speed signals from the wheel speed sensors S1, S2, S3, S4. (step S10) Each of the wheel speed sensors S1, S2, S3, S4 in the normal state outputs a signal depending on the associated wheel speed, but outputs a signal not depending on the associated wheel speed when an abnormality takes place due to the fault of any of the wheel speed sensors, the breaking or short circuit of signal wires for the wheel speed sensors or the like. The CPU 54 judges the occurrence of the abnormality with respect to each of the wheel speed sensors based on the difference in signal between the normal and abnormal states.

If no abnormality occurs with all of the wheel speed signals, a pre-torque operation processing is executed to obtain a pre-torque. (step S11) The pre-torque operation processing is executed by obtaining a command torque (Nm) based on a vehicle speed (km/h) which is obtained based on the wheel speeds and a throttle opening degree (%) which is obtained based on the throttle opening signal. The command torque is a base torque which is to be transmitted to the sub-drive wheels RT3, RT4, and the value of the command torque is set in dependent upon the character of the vehicle itself or the kind of the vehicle to rotate the sub-drive wheels RT3, RT4 with such a torque that is suitable to the vehicle traveling or running state which is inferred from the vehicle speed and the throttle opening degree. For example, the value of the command torque can be expressed by a three-dimensional feedforward or base map shown in FIG. 4. It is to be noted that as pre-torque, there can be used either one which has been stored in advance in the ROM 56 in the form of mapped data or one which is obtained by a predetermined calculating equation.

Then, the CPU 54 executes a ΔN torque calculation to obtain a ΔN torque. (step S12) The calculation of the ΔN torque is executed by obtaining a torque (ΔN torque) acting on the sub-drive wheels RT3, RT4 based on a front-rear wheel speed difference (average wheel speed difference ΔN) which represents the result of subtracting the average value of wheel speeds of the two-rear wheels RT3, RT4 (average rear wheel speed) from the average value of wheels speeds of the two-front wheels RT1, RT2 (average front wheel speed). This ΔN torque is a compensation torque to be added to the pre-torque which is the foregoing base torque, and the value of the ΔN torque is set to be suitable to the vehicle traveling or running state which is inferred from the average wheel speed difference ΔN between the front wheels RT1, RT2 and the rear wheels RT3, RT4. For example, the ΔN torque can be represented in the form of a two-dimensional feedback or secondary map shown in FIG. 5. It is to be noted that like the foregoing pre-torque, the ΔN torque may be either one which has been stored in the ROM 56 in advance in the form of mapped data, or one which the CPU 54 obtains by a predetermined calculating equation.

Subsequently, a transmission torque which is to be finally applied to the sub-drive wheels RT3, RT4 is obtained by adding the ΔN torque to the pre-torque. (step S13) More specifically, a distribution torque is obtained in dependence on the vehicle speed, the throttle opening degree and the average wheel speed difference between the front and rear wheels. The distribution torque thus obtained is output as a command value to the torque distribution device 22, which therefore performs the torque distribution in response to the command value.

On the other hand, if it is judged at step S10 that any one of the wheel speed signals involves an abnormality, the vehicle speed is fixed to zero (step S14) and a pre-torque operation processing is carried out to obtain a pre-torque (step S15). Unlike the pre-torque operation processing at step S11, the pre-torque operation processing at this step results in obtaining a command torque in dependence on only the throttle opening degree because of the vehicle speed having been fixed zero (0). It may be the case that a map which depends only on the throttle opening for use in an abnormal state is prepared in advance independently of the foregoing base map and is used to obtain the pre-torque.

Next, the CPU 54 executes the ΔN torque operation processing to obtain a ΔN torque (compensation torque). Unlike the ΔN torque operation processing at step S12, the ΔN torque operation processing at this step is to fix the ΔN torque to zero (0). (step S16) Then, the ΔN torque is added to the pre-torque to obtain a torque (distribution torque) finally applied to the sub-drive wheels RT3, RT4. Since the ΔN torque is zero (0), the distribution torque becomes equal to the pre-torque. Accordingly, where an abnormal state occurs, the distribution torque is caused to take the value depending only on the throttle opening degree, whereby the distribution torque so determined is output as the command value to the torque distribution device 22.

As described hereinabove, the torque distribution control device for the four-wheel drive vehicle according to the first embodiment is of the type having a torque distribution device 22 for distributing the drive power transmitted from the engine 12 to the prime drive wheels RT1, RT2, to the sub-drive wheels RT3, RT4 and is provided with the following means. That is, the control device is provided with abnormality judgment means (step S10) for judging whether or not an abnormality is involved in the wheel speed signals; normal-state pre-torque setting means (step S11) for setting the pre-torque based on the vehicle speed and the throttle opening degree if the abnormality judgment means (step S10) judges that no abnormality is involved in the wheel speed signals; normal-state compensation torque setting means (step S12) for setting the compensation torque (ΔN torque) based on the average wheel speed difference ΔN which is obtained by subtracting the average wheel speed of the two-rear wheels from that of the two-front wheels if the abnormality judgment means (step S10) judges that no abnormality is involved in the wheel speed signals; abnormal pre-torque setting means (steps S14, S15) for setting the pre-torque based only on the throttle opening degree with the vehicle speed being fixed to zero (0) if the abnormality judgment means (step S10) judges that an abnormality is involved in the wheel speed signals; and abnormal-state compensation torque setting means (step S16) for compulsorily setting the compensation torque to zero (0) if the abnormality judgment means (step S10) judges that an abnormality is involved in the wheel speed signals. The control device is further provided with distribution torque setting means (step S13) for setting the distribution torque to the sub-drive wheels RT3, RT4 by adding the compensation torque set by the normal-state compensation torque setting means (step S12) to the pre-torque set by the normal-state pre-torque setting means (step S11) to output the command value depending on the distribution torque so set to the torque distribution device 22 if the abnormality judgment means (step S10) judges that no abnormality is involved in the wheel speed signals and for setting as the distribution torque to the sub-drive wheels RT3, RT4 the pre-torque which is set by the abnormal pre-torque setting means (steps S14, S15) with the compensation torque being set to zero by the abnormal-state compensation torque setting means (step S16), to output the command value depending on the distribution torque so set to the torque distribution device 22.

According to the foregoing torque distribution control device for the four-wheel drive vehicle, when an abnormality occurs with respect to the wheel speed signals, the distribution torque is set without employing the vehicle speed and the average wheel speed difference obtained based on the wheel speed signals which are in short of reliability, and is used as the command value to control the torque distribution device. Therefore, it becomes possible to maintain the drive-through capability of the four-wheel drive vehicle without harming the safety capability.

(Another Form of Control Operation in the First Embodiment)

Figure 6:
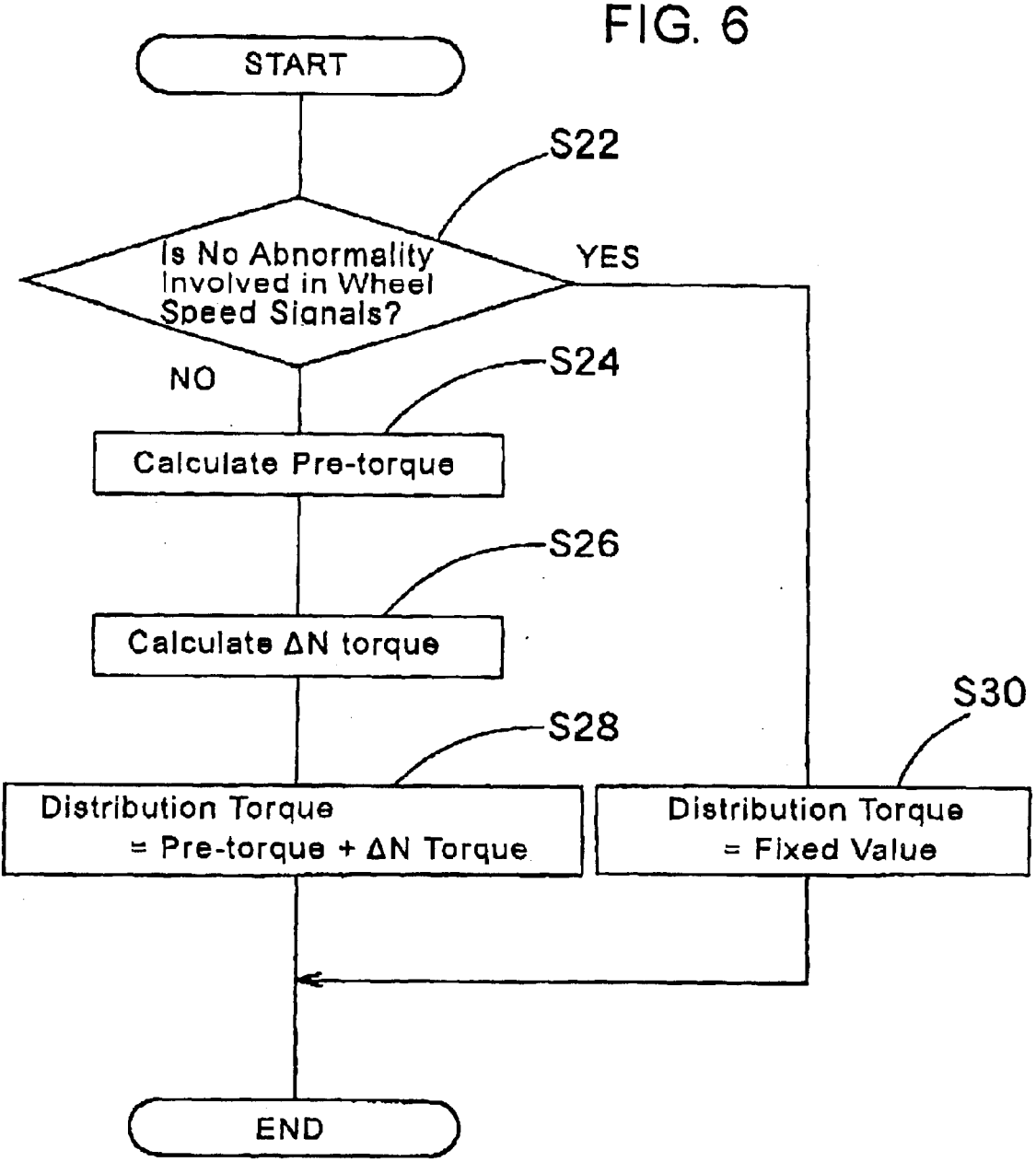
FIG. 6 is a flow chart showing a modified form of the torque distribution control executed by the electronic control circuit in the first embodiment.

Another form of the control operation which the electronic control circuit 50 performs for the torque distribution device 22 will be described hereinafter with reference to FIG. 6.

In the same manner as done at step S10 in the foregoing form of the control operation, a judgment is made based on the wheel speed sensors S1, S2, S3, S4 as to whether or not, an abnormality is involved in the wheel speed signal of each of the wheel speed sensors S1, S2, S3, S4. (step S22)

If no abnormality is judged to be involved in any of the wheel speed signals (step S22), like step S11 in the foregoing form of control operation, the pre-torque operation processing is performed to obtain the pre-torque. (step S24) It is to be noted that the content of the processing at step S24 is the same as that at step S11. Then, the CPU 54, as did at step S12 of the foregoing form of control operation, executes the ΔN torque operation processing to obtain the ΔN torque (compensation torque). (step S26) It is to be noted that the content of the processing at step S26 is the same as that at step S12. Subsequently, in the same manner as step S13 of the foregoing form of operation processing, the ΔN torque is added to the pre-torque to obtain a torque (distribution torque) to be finally applied to the sub-drive wheel RT3, RT4. (step S28) That is, at step S28, as done at step S13, the distribution torque is obtained in dependence on the vehicle speed, the throttle opening degree and the average wheel speed difference between the front and rear wheels. The distribution torque thus obtained is output as the command value to the torque distribution device 22, whereby the same performs the torque distribution in dependence on the command value.

If it is judged at step S22 that an abnormality is involved in any one of the wheel speed signals, on the contrary, the distribution torque is set to a fixed value. (step S30) This fixed value corresponds to the torque that secures the drive-through capability of the vehicle and is the value obtained in advance through experiments. The fixed torque is output as the command value to the torque distribution device 22, and the same performs the torque distribution in dependence on the command value.

As described hereinabove, the torque distribution control device for the four-wheel drive vehicle according to another form of the control operation in the first embodiment is of the type having the torque distribution device 22 for distributing the drive power transmitted from the engine 12 to the prime drive wheels RT1, RT2, to the sub-drive wheels RT3, RT4 and is provided with the following means. That is, the control device is provided with abnormality judgment means (step S22) for judging whether or not, an abnormality is involved in the wheel speed signals; normal-state pre-torque setting means (step S24) for setting the pre-torque based on the vehicle speed and the throttle opening degree if the abnormality judgment means (step S22) judges that no abnormality is involved in the wheel speed signals; normal-state compensation torque setting means (step S26) for setting the compensation torque (ΔN torque) based on the average wheel speed difference ΔN which is obtained by subtracting the average wheel speed of the two rear wheels from that of the two front wheels if the abnormality judgment means (step S22) judges that no abnormality is involved in the wheel speed signals; normal-state distribution torque setting means (step S28) for setting the distribution torque to the sub-drive wheel RT3, RT4 by adding the compensation torque set by the normal-state compensation torque setting means (step S26) to the pre-torque set by the normal-state pre-torque setting means (step S24) to output the command value depending on the distribution torque so set to the torque distribution device 22 if the abnormality judgment means (step S22) judges that no abnormality is involved in the wheel speed signals, and abnormal-state distribution torque setting means (step S30) for setting a fixed value torque as the distribution torque to the sub-drive wheels RT3, RT4, to output the command value depending on the distribution torque so set to the torque distribution device 22.

Also according to the torque distribution control device for the four-wheel drive vehicle, when an abnormality occurs with respect to the wheel speed signals, the distribution torque is set without employing the vehicle speed and the average wheel speed difference obtained based on the wheel speed signals which are in short of reliability, and is used as the command value to control the torque distribution device. Therefore, it becomes possible to maintain the drive-through capability of the vehicle without harming the safety capability.

(Second Embodiment)

Figure 4:
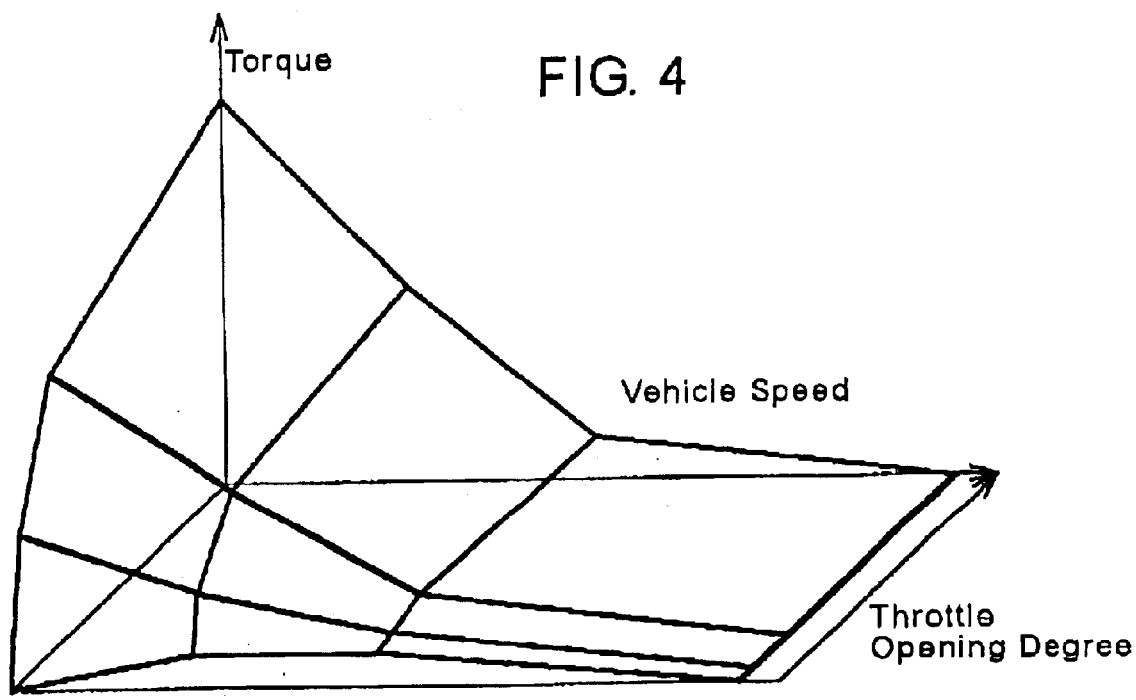
FIG. 4 is an explanatory view representing a base map used to perform the torque distribution control in the first embodiment.
Figure 5:
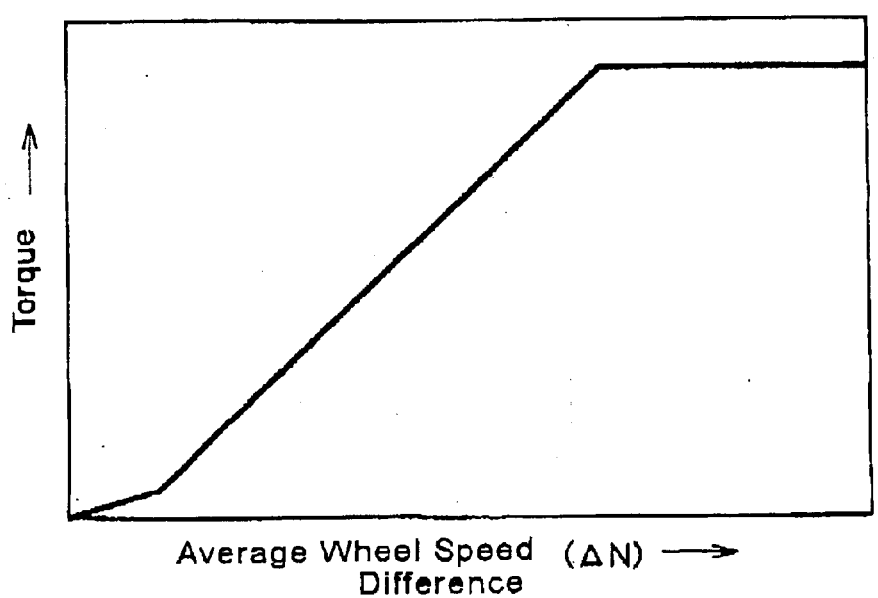
FIG. 5 is an explanatory view representing a compensation map used to perform the torque distribution control in the first embodiment.

A torque distribution control device for a four-wheel drive vehicle according to the second embodiment of the present invention has basic configurations as shown in FIGS. 1, 2, 4 and 5. That is, the mechanism of the four-wheel drive vehicle shown in FIG. 1 is common to this second embodiment as well as to the foregoing first embodiment. Further, the electronic control circuit 50 shown in FIG. 2 and the maps shown in FIGS. 4 and 5 are common to this second embodiment as well as to the first embodiment. Therefore, the descriptions made with reference to FIGS. 1, 2, 4 and 5 in the first embodiment are incorporated into this second embodiment to form a part thereof. Throughout this second embodiment, the map shown in FIG. 4 is called a "base map" and the map shown in FIG. 5 is called a "rotational difference map" or a "secondary map".

In the second embodiment, during the normal running of the four-wheel drive vehicle, the CPU 54 of the electronic control circuit 50 obtains a command torque to the clutch discs or mechanism 30 as follows:

That is, the CPU 54 first obtains a base command torque by making reference to the base map shown in FIG. 4 on the basis of the vehicle speed and the throttle opening degree. The CPU also obtains a rotational difference command torque from the rotational difference map shown in FIG. 5 based on the rotational difference or the average wheel speed difference ΔN between the front and rear wheels. Then, the CPU 54 calculates a final command torque by adding the rotational difference command torque to the base command torque, namely by using the equation noted below. The CPU 54 calculates a coil current value to be supplied to the electromagnetic clutch of the clutch discs 30, based on the final command torque and outputs the coil current value thereto as a control signal.

Command Torque=Base Command Torque+Rotational Difference Command Torque

During the operation processing for the command torque, the CPU 54, when has input thereto an abnormal signal indicative of an abnormality in the wheel speed signals, executes a processing for the abnormal wheel speed signal as described later in detail. In this event, the CPU 54 does not use the wheel speed signal which is assumed to be an abnormal signal, but uses the wheel speed signal of the wheel at the opposite side of the abnormal wheel and calculates the command torque in a restricted method to execute torque distribution control for the sub-drive wheels, whereby the vehicle can continue traveling in the four-wheel drive mode, namely traveling with the four wheels being given the drive torque from the engine 12.

Figure 7:
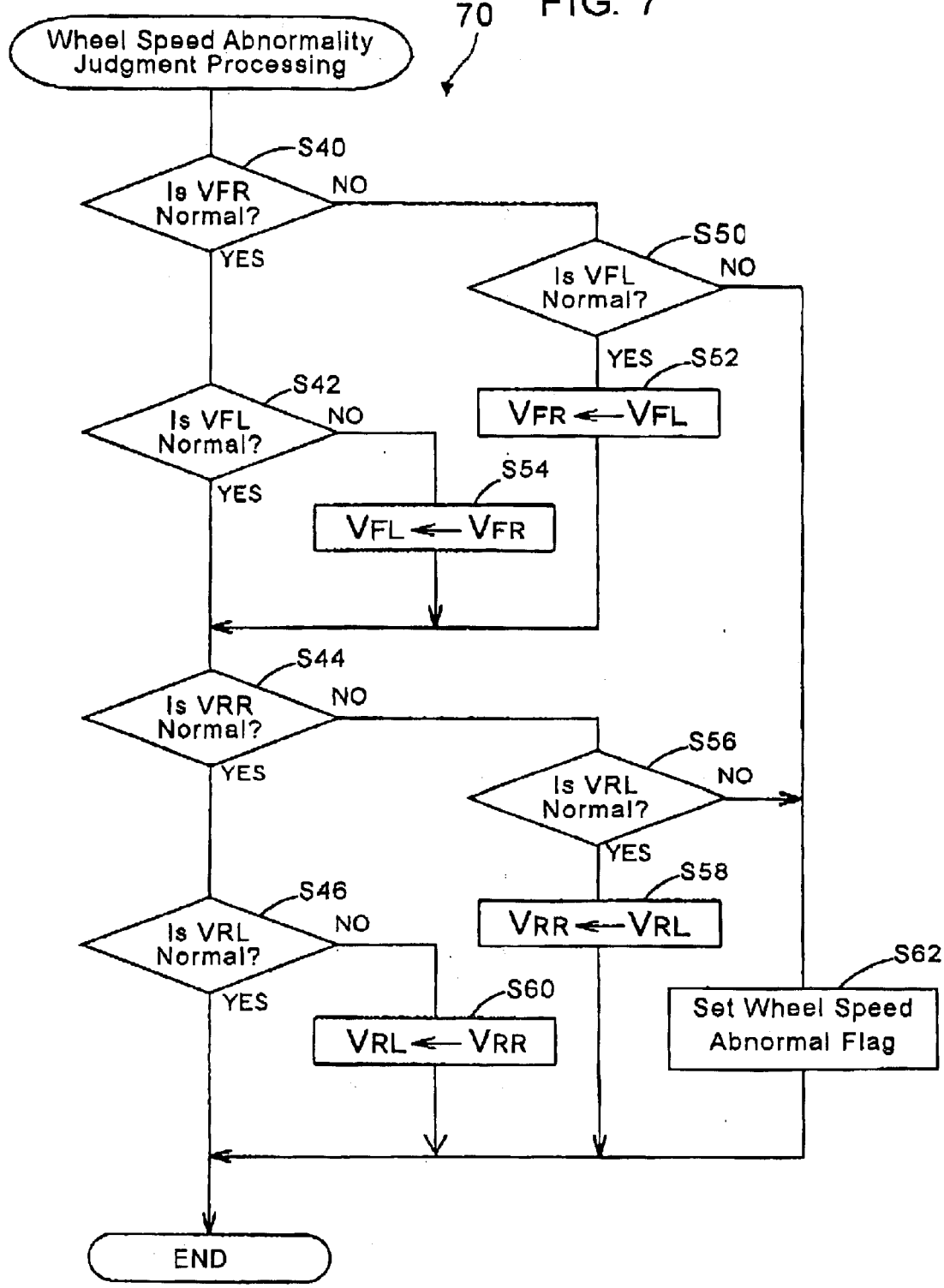
FIG. 7 is a flow chart showing a wheel speed abnormality judgment processing executed by the electronic control circuit in the second embodiment of the present invention.
Figure 8:
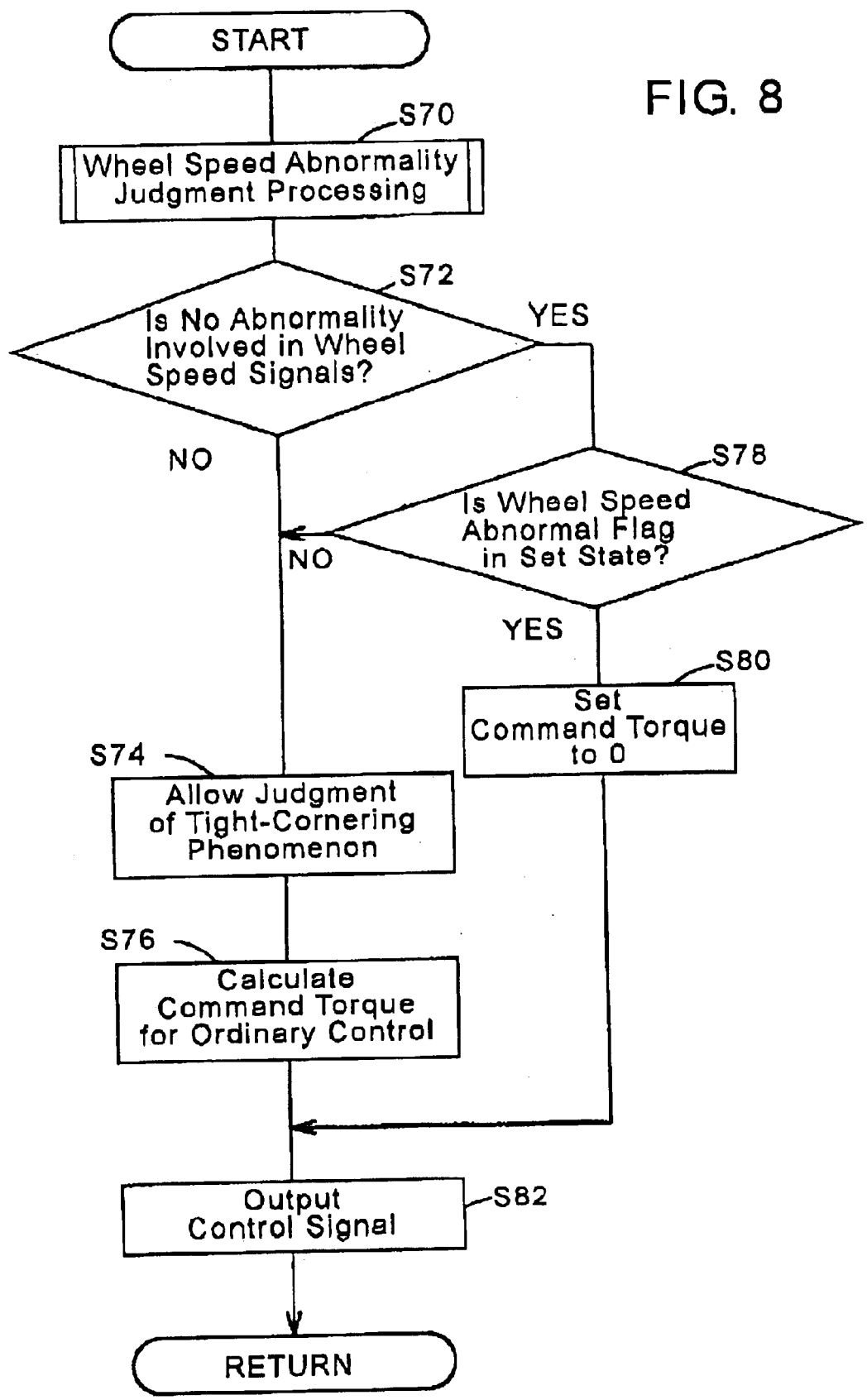
FIG. 8 is a flow chart showing another specific form of the torque distribution control executed by the electronic control circuit in the second embodiment.

In operation, during the traveling of the vehicle, the torque distribution control device executes the torque distribution operation in accordance with the flow chart shown in FIGS. 7 and 8. Prior to the operation processing for a command torque, the CPU 21 executes a wheel speed abnormal judgment processing shown in FIG. 7 and also shown as step S70 in FIG. 8. In this processing, first of all, step S40 is executed to judge whether the front right wheel speed signal VFR is normal or not. Step S42 is then reached if the wheel speed signal VFR from the front right wheel sensor S2 is normal, but step S50 is then reached if the wheel speed signal VFR is abnormal. At step S42, it is judged whether a front left wheel speed signal VFL from the front left wheel speed sensor S1 is normal or not. The same judgment as that at step S42 is made at step S50.

If the front left wheel speed signal VFL is judged to be normal at step S42, step S44 is next reached. On the other hand, if the front left wheel speed signal VFL is judged to be abnormal, step S54 then follows, wherein a processing is executed to replace the abnormal front left wheel speed signal VFL by a normal front right wheel speed signal VFR and to use the normal front right wheel speed signal VFR in substitution for the abnormal front left wheel speed signal VFL. In the same manner as above, if the front left wheel speed signal VFL is judged to be normal at step S50, the routine then proceeds to step S52, wherein a processing is executed to replace the abnormal front right wheel speed signal VFR by the normal front left wheel speed signal VFL and to use the normal front left wheel speed signal VFL in substitution for the abnormal front right wheel speed signal VFR. On the other hand, if the front left wheel speed signal VFL is judged to be abnormal at step S50, the routine goes to step S62, wherein a wheel speed abnormal flag is set because the wheel speed signals of the front wheels have been judged to be both abnormal.

At step S44, it is judged whether the rear right wheel speed signal VRR is normal or not. The routine proceeds to step S46 if the wheel speed signal from the rear right wheel speed sensor S4 is normal, but to step S56 if it is abnormal. It is judged at step S46 whether the rear left wheel speed signal VRL is normal or not, and it is judged at step S56 as well whether the rear left wheel speed signal VRL is normal or not.

Thereafter, the processing shown in FIG. 7 is terminated if the rear left wheel speed signal VRL is judged to be normal at step S46. If the rear left wheel speed signal VRL is judged to be abnormal, step S60 is next reached, wherein a processing is executed to replace the abnormal rear left wheel speed signal VRL by the normal rear right wheel speed signal VRR and to use the normal rear right wheel speed signal VRR in substitution for the abnormal rear left wheel speed signal VRL. In the same manner, if the rear left wheel speed signal VRL is judged to be normal at step S56, there comes next step S58, wherein the abnormal rear right wheel speed signal VRR is replaced by the normal rear left wheel speed signal VRL to set the replaced signal as the rear right wheel signal VRR. On the contrary, if the rear left wheel speed signal VRL is judged to be abnormal at step S56, the wheel speed signals of the rear left and right wheels are assumed both abnormal, whereby the wheel speed abnormal flag is set at step S62.

As described above, if any one of the four wheel speed signals is abnormal, the abnormal wheel speed signal is replaced by the normal wheel speed signal of the wheel located opposite in the left and right direction, and the replaced normal wheel speed signal is used for the torque distribution control which is performed thereafter. However, if the wheel speed signals of the left and right wheels are both abnormal, the wheel speed abnormal flag is set to execute an abnormal processing referred to later.

The foregoing processing is executed at step S70 of the routine shown in FIG. 8, and further steps follow in dependence on the result of the wheel speed abnormality judgment processing at step S70. Specifically, as executed in accordance with the flow chart shown in FIG. 8, it is judged at step S72 whether or not, abnormality is involved in the wheel speed signals. If no abnormality is involved in all of the wheel speed signals, the routine proceeds to step S74 to allow the judgment of a tight-cornering phenomenon. Therefore, at the next step S76, a command torque in an ordinary control mode is calculated, and a coil current value applied to the electromagnetic clutch of the clutch mechanism 30 is calculated based on the command torque and is output to the coupling device 22.

In the calculation of the command torque, a base command torque is obtained by making reference to the base map shown in FIG. 4 based on a detected vehicle speed and a detected throttle opening degree, and a rotational difference command torque is obtained by making reference to the rotational difference map shown in FIG. 5 based on the rotational difference ΔN between the front wheels RT1, RT2 and the rear wheels RT3, RT4. Then, the base command torque and the rotational difference command torque are added to calculate a final command torque, on the basis of which a coil current value to be applied to the electromagnetic clutch of the clutch mechanism 30 is further calculated to be output as a control signal to the coupling device 22. (step S82)

On the other hand, if it is judged at the foregoing step S72 that abnormality is involved in the wheel speed signals, the routine goes to step S78 to judge whether the wheel speed abnormal flag is in a set state or not. If the wheel speed abnormal flag is in the set state, the wheel speed signals of at least either the front left and right wheels or the rear left and right wheels are both abnormal, which is the state to unable to complement. Therefore, the routine next proceeds to step S80, wherein the torque distribution control is performed to discontinue the torque distribution to the sub-driven wheels RT3, RT4.

Further, if the wheel speed flag is judged to be in a rest state at step S78, step S74 is next reached to allow the judgment of the tight-cornering phenomenon. At this step, the judgment of the tight-cornering phenomenon is executed based on the those including the foregoing replaced, normal wheel speed signal.

As described in detail hereinabove, when any one of the four wheel speed signals is abnormal, the abnormal wheel speed signal is replaced by the normal wheel speed signal of the wheel which is located opposite thereto in the left and right direction, to use the replaced, normal wheel speed signal in substitution for the abnormal wheel speed signal. The replaced, normal wheel speed signal is used in torque distribution control. However, only when the wheel speed signals of the left and right wheels at either front side or rear side are both abnormal, the wheel speed abnormal flag is set to make the command torque zero (0) thereby to discontinue the torque distribution to the sub-drive wheels. Consequently, when the wheel signal of any one of the left and right wheels at front or rear side is abnormal, the torque distribution control can be performed, so that the vehicle can travel in the four-wheel drive mode. Accordingly, the torque distribution control device in the second embodiment enables the vehicle to travel in the four-wheel drive mode even when abnormality occurs with any one of the wheel speed signals. Therefore, in comparison with the prior art device wherein the torque distribution control is discontinued to return to two-wheel drive mode in such abnormal state, the vehicle with the torque distribution control device in the second embodiment is advantageous in that when abnormality occurs on the wheel speed signals with the vehicle traveling on a slippery place such as snowed sloping road, the vehicle can drive through that place to a safe place.

(Third Embodiment)

A torque distribution control device for a four-wheel drive vehicle according to the third embodiment of the present invention has basic configurations as shown in FIGS. 1, 2, 4 and 5. That is, the mechanism of the four-wheel drive vehicle shown in FIG. 1 is common to this third embodiment as well as to the foregoing first embodiment. Further, the electronic control circuit 50 shown in FIG. 2 and the maps shown in FIGS. 4 and 5 are common to this third embodiment as well as to the first embodiment. Therefore, the descriptions made with reference to FIGS. 1, 2, 4 and 5 in the first embodiment are incorporated into this third embodiment to form a part thereof. In this third embodiment, the map shown in FIG. 4 is called a "base map" and the map shown in FIG. 5 is called a "rotational difference map" or a "secondary map".

In the third embodiment, during the normal running of the four-wheel drive vehicle, the CPU 54 of the electronic control circuit 50 obtains a command torque to the clutch mechanism 30 as follows:

That is, the CPU 54 first obtains a base command torque by making reference to the base map shown in FIG. 4 on the basis of the vehicle speed and the throttle opening degree. The CPU 54 also obtains a rotational difference command torque from the rotational difference map shown in FIG. 5 based on the rotational difference or wheel speed difference $\Delta N$ between the front and rear wheels. Then, the CPU 54 calculates a final command torque by adding the rotational difference command torque to the base command torque, namely by using the equation noted below. The CPU 54 calculates a coil current value to be supplied to the electromagnetic clutch of the clutch mechanism 30, based on the command torque and outputs the coil current value thereto as a control signal.

Command Torque=Base Command Torque+Rotational Difference Command Torque

During the operation processing for the command torque, the CPU 54, when has input thereto an abnormal signal indicative of an abnormal in the wheel speed signals, prevents itself from making an judgment concerning the tight-cornering phenomenon and calculates the command torque in a restricted method to execute torque distribution control for the sub-drive wheels, whereby the vehicle can continue traveling in the four-wheel drive mode, namely traveling with the four wheels being given the drive torque from the engine 12.

The control operation of the torque distribution control device at the occurrence of an abnormality in the wheel speed signals will be described hereinafter with reference to FIG. 9.

Figure 9:
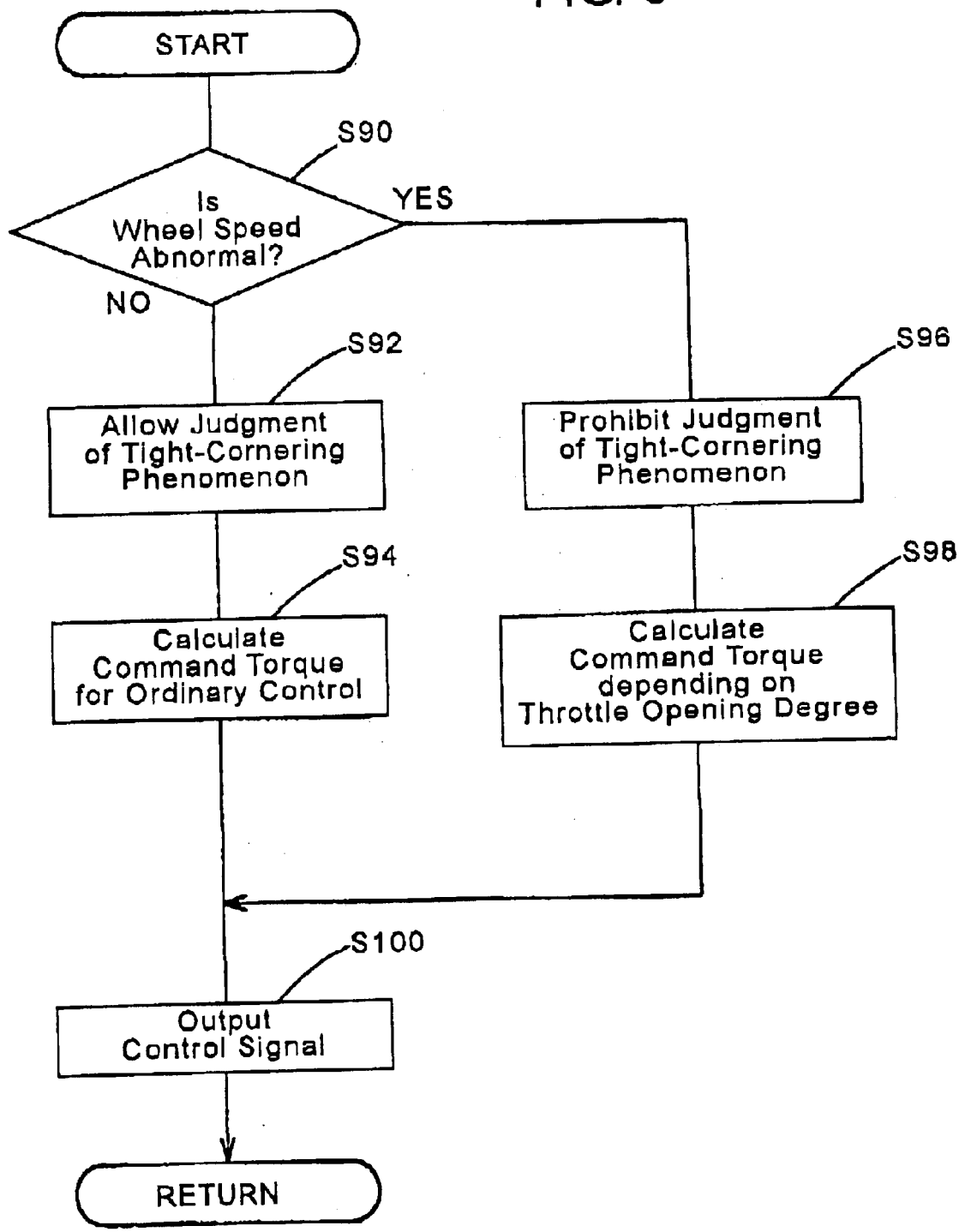
FIG. 9 is a flow chart showing still another specific form of the torque distribution control executed by the electronic control circuit in the third embodiment of the present invention.

In operation, during the traveling of the vehicle, the torque distribution control device executes the torque distribution operation in accordance with the flow chart shown in FIG. 9. First of all, the CPU 54 judges at step S90 whether or not, an abnormality is involved in the wheel speed signals. The judgment of the occurrence of the abnormality is made of, for example, whether or not, an abnormal detection signal has been issued from an abnormality detection circuit (not shown) of an antilock brake system known as an "ABS system". When the wheel speed data represents an abnormal value due to the fault of any of the wheel speed sensors S1, S2, S3, S4 or the breaking or short circuit of the signal cables for these sensors, the abnormality detection signal is issued, and the abnormality of the wheel speeds is judged to have occurred. In the absence of the abnormality detection signal, the abnormality of the wheel speeds is judged not to have occurred, and the routine proceeds from step S90 to step S92 to allow the judgment of the tight-cornering phenomenon. It is to be noted that instead of utilizing the abnormal detection signal issued from the aforementioned antilock brake system, the occurrence of the abnormality may be detected in dependence upon the set or reset state of the wheel speed abnormal flag in the same manner as done at step S78 shown in FIG. 8 in the foregoing second embodiment.

The judgment of the tight-cornering phenomenon is made of whether or not, a slip occurs on the wheels which are located outside with respect to the center of a turning motion of the vehicle, whether or not, the steering angle of the steering handle SW is larger than a predetermined angle, or whether or not, the turning radius of the vehicle is smaller than a predetermined value. When a slip takes place on the wheels outside radially of the turning radius or when the turning radius is smaller than the predetermined value, it is judged that the tight-cornering phenomenon is to occur, in which case the command torque is controlled to be reduced to zero (0). On the other hand, when no slip occurs on the wheels which are radially outside of the turning motion and either when the steering angle of the steering handle SW is smaller than the predetermined angle or when the turning radius is larger than the predetermined value, the tight-cornering phenomenon is judged not to occur, in which case at step S94, a command toque for the ordinary control is calculated to perform the torque distribution control.

In the calculation of the command torque, a base torque is obtained by making reference to the base map shown in FIG. 4 based on a detected vehicle speed and a detected throttle opening degree of the vehicle, and a rotational difference torque is obtained by making reference to the rotational difference map shown in FIG. 5 based on the rotational difference or wheel speed difference ΔN between the front wheels RT1, RT2 and the rear wheels RT3, RT4. Then, the base command torque and the rotational difference command torque are added for a final command torque, on the basis of which a coil current value to be applied to the electromagnetic clutch of the clutch mechanism 30 is further calculated to be output as a control signal to the coupling device 22 at step S100.

On the contrary, if it is judged at step S90 that an abnormality is involved in any one of the wheel speed signals, the routine proceeds to step S96, wherein the judgment of the tight-cornering phenomenon is prevented from being made. In this case, step S98 is then reached, whereby a command torque in this restricted situation is calculated by making reference to the base torque map based on a detected throttle opening degree.

In the calculation of the command torque in this case, the vehicle speed data obtained from the wheel speed signals is taken as zero (0) because an abnormality is involved in the wheel speed signals, and the command torque is calculated by making reference to the base map shown in FIG. 4 based on the throttle opening degree detected by the throttle opening sensor S6. Thereafter, a coil current value to be applied to the electromagnetic clutch of the clutch mechanism 30 is calculated based on the command torque, and a control signal representing the current value is output to the coupling device 22. In a modified form, the command torque in this abnormal situation may be a predetermined fixed value.

As described above, where the detected wheel speed signals involve an abnormality, the judgment of the tight-cornering phenomenon is prohibited, so that it does not take place that the wheel speed signals including abnormal one are used to execute a wrong judgment of the tight-cornering phenomenon. This advantageously results in that hunting does not occurs in the toque transmitted to the sub-drive wheels, and that the vehicle can be run stably in the four-wheel drive mode even in the event of the abnormality occurring.

Furthermore, when the wheel speed signals involve an abnormality, a command torque is set using the throttle opening degree and a fixed value in place of the wheel speed data. Thus, the torque distribution control is carried out to continue traveling in the four-wheel drive mode, without making the command torque zero thereby to return to the two-wheel drive mode. Accordingly, in comparison with the prior art device which discontinues the torque distribution control to return to the two-wheel drive mode in such abnormal state, the torque distribution control device in the third embodiment is advantageous in that even when abnormality occurs on the wheel speed signals with the vehicle running on a slippery place such as snowed sloping road, the vehicle can drive through the slippery place to a safe place.

(Fourth Embodiment)

A torque distribution control device for a four-wheel drive vehicle according to the fourth embodiment of the present invention has basic configurations as shown in FIGS. 1 and 2. That is, the mechanism of the four-wheel drive vehicle shown in FIG. 1 is common to this fourth embodiment as well as to the foregoing first embodiment. Further, the electronic control circuit 50 shown in FIG. 2 is common to this fourth embodiment as well as to the first embodiment. Therefore, the descriptions made with reference to FIGS. 1 and 2 in the first embodiment are incorporated into this fourth embodiment to form a part thereof.

In the fourth embodiment, during the traveling of the four-wheel drive vehicle, the electronic control circuit 50 executes a processing for preventing the tight-cornering phenomenon from taking place for the torque distribution device 22. FIGS. 10 and 11 show a control flow chart the CPU 54 of the electronic control circuit 50 executes for this purpose. On the premise that the electronic control circuit 50 executes the control of preventing the tight-cornering phenomenon from taking place, the electronic control circuit 50 performs a base control for continuing the four-wheel drive by a substitution control even when it judges that an abnormality is involved in any one of the wheel speed signals from the wheel speed sensors S1, S2, S3, S4. Conceptually, this substitution control is designed to try to continue the four-wheel drive by, for example, removing at least the wheel speed signal involving the abnormality from those wheel speed signals used as parameters for the four-wheel drive control.

FIG. 10 shows the control content executed when an abnormality is involved in the wheel speed signal from the wheel speed sensor S3 for the rear left wheel (RL) RT3, while FIG. 11 shows the control content executed when an abnormality is involved in the wheel speed signal from the wheel speed sensor S4 for the rear right wheel (RR) RT4.

When no abnormality is involved in the wheel speed signals from all the wheel speed sensors S1 to S4, the tight-cornering judgment is executed as usual. That is, as described in Japanese unexamined published patent applications No. 2000-25476 and No. 2001-233078, basically, the turning radius is obtained from the wheel speed signals of the wheel speed sensors S1 to S4, and a judgment is then made of whether or not, the turning radius so obtained is smaller than a critical turning radius which causes the tight-cornering phenomenon or the tight-cornering braking phenomenon to take place. When the tight-cornering braking phenomenon is judged to have taken place, the engagement force of the clutch plates 30 of the torque distribution device 22 is weakened to reduce the drive torque applied to the sub-drive wheels RT3, RT4. It is to be noted that although the wheel speed sensors S1 to S4 in the normal state output signals corresponding to the respective wheel speeds, the wheel speed signals from the sensors S1 to S4 do not come to correspond to the respective wheel speeds in the abnormal state which occurs due to the fault of each sensor, the breaking or short circuit of the signal wire therefor or the like. The CPU 54 judges the occurrence of abnormality for each of the wheel speed signals based on the difference in signal between the normal state and the abnormal state.

If an abnormality is involved in the wheel speed signal of the wheel speed sensor S3 only, as shown in FIG. 10, there is obtained a wheel speed difference ΔN between the front wheels and the rear wheels. (step S106) The wheel speed difference ΔN is calculated by subtracting the wheel speed of the rear right wheel (RR) RT4 from the average value between the wheel speed of the front right wheel (FR) RT2 and the wheel speed of the front left wheel (FL) RT1.

Then, a judgment is made of whether the wheel speed difference ΔN is smaller than a threshold value (A) or not. (step S108) The threshold value (A) is a reference value to judge the occurrence of a slip. If the wheel speed difference ΔN is larger than the threshold value (A), it is judged that the wheel speed difference ΔN is not caused by the tight-cornering braking phenomenon, but is caused by a slip which has taken place on either the front wheels (FL, FR) RT1, RT2 or the rear wheels (RR) RT4. In this situation, it is desirable to maintain the engagement force of the clutch plates 30 as it is, so that the judgment of the tight-cornering braking phenomenon is prohibited from being made. (step S110)

On the contrary, if the wheel speed difference ΔN is smaller than the threshold value (A), the method of judging the tight-cornering braking phenomenon is altered. (step S112) The altered method of judging the tight-cornering braking phenomenon is practiced based on the wheel speeds of the two front wheels (FL, FR) RT1, RT2 only. More specifically, during a left turn, the turning radius is represented by the ratio of the running distance difference, which is made by subtracting the running distance of the front left wheel (FL) RT1 from the running distance of the front right wheel (FR) RT2, to the running distance of the front left wheel (FL) RT1, namely by the ratio of the wheel speed difference, made by subtracting the wheel speed of the front left wheel (FL) RT1 from the wheel speed of the front right wheel (FR) RT2, to the wheel speed of the front left wheel (FL) RT1. And, a judgment is made of whether or not, the ratio is equal to or smaller than a predetermined ratio (threshold value B) corresponding to the turning radius which causes the tight-cornering braking phenomenon to take place. The judgment of the tight-cornering braking phenomenon in the left turn is represented by the following equation at step S112 in FIG. 10. In this judgment, FR≠0, FL≠0 and FR≧RR are to be held.

$$FL/(FR-FL) \leq \text{Threshold Value (B)}$$

On the contrary, in a right turn, the turning radius is represented by the ratio of the running distance difference, which is made by subtracting the running distance of the front right wheel (FR) RT2 from the running distance of the front left wheel (FL) RT1, to the running distance of the front right wheel (FR) RT2, namely by the ratio of the wheel speed difference, made by subtracting the wheel speed of the front right wheel (FR) RT2 from the wheel speed of the front left wheel (FL) RT1, to the wheel speed of the front right wheel (FR) RT2. And, a judgment is made of whether or not, the ratio is equal to or smaller than the predetermined ratio (threshold value B) corresponding to the turning radius which causes the tight-cornering braking phenomenon to take place. The judgment of the tight-cornering braking phenomenon in the right turn is represented by the following equation at step S112 in FIG. 10. In this judgment, FR≠0 and FL≠0 are to be held.

$$FR/(FL-FR) \leq \text{Threshold Value (B)}$$

When by this judgment, the tight-cornering phenomenon is judged to have taken place, the engagement force of the clutch plates 30 is weakened like the processing after the foregoing ordinary judgment of the tight-cornering braking phenomenon.

In the control processing shown in FIG. 11, when an abnormality is involved in the wheel speed signal of the rear right wheel (RR) RT4 only, the CPU 54 obtains a wheel speed difference ΔN between the front wheels and the rear wheels. (step S126) The wheel speed difference ΔN is calculated by subtracting the wheel speed of the rear left wheel (RL) RT3 from the average value between the wheel speed of the front right wheel (FR) RT2 and the wheel speed of the front left wheel (FL) RT1. And, a judgment is made of whether or not, the wheel speed difference ΔN is smaller than the threshold value (A). (step S128) Like the foregoing threshold value (A) shown in FIG. 10, this threshold value (A) is a reference value to judge the occurrence of a slip, and if the wheel speed difference ΔN is larger than the threshold value (A), the slip is judged to have occurred, whereby the judgment of the tight-cornering braking phenomenon is prohibited from being executed. (step S130)

If the wheel speed difference ΔN is smaller than the threshold value (A), on the contrary, the method of judging the tight-cornering braking phenomenon is altered. (step S132) In this altered method of judging the tight-cornering braking phenomenon, in the same manner as represented in FIG. 10, the judgment is made based on the wheel speeds of the two front wheels (FL, FR) RT1, RT2 only. More specifically, in a left turn, a judgment is made of whether or not, the ratio of the wheel speed difference, made by subtracting the wheel speed of the front left wheel (FL) RT1 from the wheel speed of the front right wheel (FR) RT2, to the wheel speed of the front left wheel (FL) RT1 is smaller than the predetermined ratio (threshold value B) corresponding to the turning radius which causes the tight-cornering braking phenomenon to take place. In this judgment, FR≠0, and FL≠0 are to be held.

On the other hand, in a right turn, a judgment is made of whether or not, the ratio of the wheel speed difference, made by subtracting the wheel speed of the front right wheel (FR) RT2 from the wheel speed of the front left wheel (FL) RT1, to the wheel speed of the front right wheel (FR) RT2 is smaller than the predetermined ratio (threshold value B) corresponding to the turning radius which causes the tight-cornering braking phenomenon to take place. In this judgment, FR≠0, FL≠0 and FR≧RR are to be held. When by this judgment, the tight-cornering braking phenomenon is judged to have taken place, the engagement force of the clutch plates 30 is weakened like the processing after the foregoing ordinary judgment of tight-cornering braking phenomenon.

Though not shown in the drawings, when an abnormality is involved in the wheel speed signal of either the wheel speed sensor S1 or the wheel speed sensor S2 of the two front wheels (FL, FR) RT1, RT2, the judgment of the tight-cornering braking phenomenon is executed based on the wheel speed signals of the wheel speed sensors S3, S4 for the two rear wheels (RL, RR) RT3, RT4 only, like the foregoing judgment of the tight-cornering braking phenomenon.

As described hereinbefore, the torque distribution control device for the four-wheel drive vehicle in the fourth embodiment is provided with the torque distribution device 22 for distributing the drive power transmitted from the engine 12 to the prime drive wheels RT1, RT2 to the sub-drive wheels RT3, RT4 and is capable of continuing the four-wheel drive even when an abnormality occurs with the wheel speed signal of any one wheel within the four front and rear wheels (FL, FR, RL, RR) RT1, RT2, RT3, RT4. The control device is provided with front-rear wheel speed difference operation means (steps S106, S126) for the wheel speed difference ΔN between the front wheels and the rear wheels from the normal wheel speed signals in an abnormal state; tight-cornering judgment prohibition means (step S110, S130) for prohibiting the judgment for the tight-cornering braking phenomenon from being made when the wheel speed difference ΔN between the front wheels and the rear wheels is larger than the threshold value (A) which is the reference of the slip judgment; and abnormal-state tight-cornering judgment means (step S112, S132) for altering the normal-state tight-cornering judgment to the abnormal-state tight-cornering judgment which is made based on the wheel speed signals of the two inside and outside wheels of either the front wheels (FL, FR) RT1, RT2 or the rear wheels (RL, RR) RT3, RT4 which are both normal, when the front-rear wheel speed difference ΔN is smaller than the threshold value (A).

Thus, according to the fourth embodiment, it can be realized to continue the four-wheel drive even when an abnormality occurs with any one wheel of the four front and rear wheels (FL, FR, RL, RR) RT1, RT2, RT3, RT4.

As understood from the foregoing description, in each of the first to fourth embodiments, when an abnormality occurs with any one of the wheel speed signals associated with the four front and rear wheels, the control method of calculating a torque command to be applied to the torque distribution device is altered from one for the normal state to another for the abnormal state, so that the vehicle is enabled to continue the four wheel drive even at the occurrence of the abnormality with respect to the wheel speed signals.

The wheel speed abnormality judgment processing in the second embodiment shown in FIG. 7 may be used in any of the first, third and fourth embodiment.

Although the four-wheel drive vehicle in the aforementioned embodiments is exemplified to be of the type that the front wheels RT1, RT2 act as the prime drive wheels while the rear wheels RT3, RT4 act as the sub-drive wheels, it may be of the type that the rear wheels RT3, RT4 act as the prime drive wheels while the front wheels RT1, RT2 act as the sub-drive wheels.

Obviously, numerous modifications and variations of the present invention are possible in light of the above teachings. It is therefore to be understood that within the scope of the appended claims, the present invention may be practiced otherwise than as specifically described herein.

What is claimed is:

1. A torque distribution control device for a four-wheel drive vehicle having a torque distribution device for distributing the drive power transmitted from an engine to prime drive wheels, to sub-drive wheels, said control device comprising abnormality judgment means for judging whether or not an abnormality is involved in wheel speed signals relating to said prime drive wheels and said sub-drive wheels; and means for altering a normal-state method of calculating a command torque which is applied to said torque distribution device to vary said drive power transmitted to said sub-drive wheels, to an abnormal-state method of calculating said command torque based on data which does not include one wheel speed signal involving said abnormality when the same occurs with one of said wheel speed signals, whereby said vehicle is enabled to continue the four-wheel drive even when said abnormality occurs.

2. A torque distribution control device for a four-wheel drive vehicle having a torque distribution device for distributing the drive power transmitted from an engine to prime drive wheels, to sub-drive wheels, said control device comprising abnormality judgment means for judging whether or not an abnormality is involved in wheel speed signals relating to said prime drive wheels and said sub-drive wheels; normal-state torque setting means for setting a command torque based on a vehicle speed, a throttle opening degree and a wheel speed difference between said prime drive wheels and said sub-drive wheels if said abnormality judgment means judges that no abnormality is involved in said wheel speed signals; abnormal-state torque setting means for setting said command torque based on said throttle opening degree only if said abnormality judgment means judges that an abnormality is involved in said wheel speed signals; and distribution torque setting means for outputting to said torque distribution device a command value depending on said command torque set by said normal-state torque setting means or said abnormal-state torque setting means.

3. A torque distribution control device for a four-wheel drive vehicle having a torque distribution device for distributing the drive power transmitted from an engine to prime drive wheels, to sub-drive wheels, said control device comprising abnormality judgment means for judging whether or not an abnormality is involved in wheel speed signals relating to said prime drive wheels and said sub-drive wheels; normal-state torque setting means for setting a command torque based on a vehicle speed, a throttle opening degree and a wheel speed difference between said prime drive wheels and said sub-drive wheels if said abnormality judgment means judges that no abnormality is involved in said wheel speed signals; abnormal-state torque setting means for setting said command torque based on a predetermined fixed value if said abnormality judgment means judges that an abnormality is involved in said wheel speed signals; and distribution torque setting means for outputting to said torque distribution device a command value depending on said command torque set by said normal-state torque setting means or said abnormal-state torque setting means.

4. A torque distribution control device for a four-wheel drive vehicle capable of controlling a command torque in distributing the drive power from an engine of said four-wheel drive vehicle to sub-drive wheels, in dependence on the traveling state of said vehicle, said control device comprising wheel speed detection means for detecting the wheel speed of each of four wheels including said sub-drive wheels; and command torque calculation means for calculating said command torque by the use of wheel speed data which said wheel speed detection means detects for each of said four wheels; wherein when an abnormality is involved in any one of wheel speed signals of either front wheels or rear wheels detected by said wheel speed detection means, the command torque calculation means replaces wheel speed data of the abnormal wheel speed signal by wheel speed data of a normal wheel speed signal of the wheel located opposite in the left-right direction and employs the replaced normal wheel speed data to calculate said command torque.

5. A torque distribution control device as set forth in claim 4, wherein said command torque calculation means uses throttle opening data indicative of throttle opening degree of said engine, data of speed difference between said front wheels and said rear wheels and vehicle speed data of said vehicle in calculating said command torque.

6. A torque distribution control device for a four-wheel drive vehicle capable of controlling a command torque in distributing the drive power from an engine of said four-wheel drive vehicle to sub-drive wheels, in dependence on the traveling state of said vehicle, said control device comprising wheel speed detection means for detecting the wheel speed of each of four wheels including said sub-drive wheels; and command torque calculation means for calculating said command torque by the use of wheel speed data which said wheel speed detection means detects for each of said four wheels; tight-cornering judgment means for judging whether a tight-cornering phenomenon takes place or not, by the use of wheel speed data which said wheel speed detection means detects for each of said four wheels; and tight-cornering state control means for controlling said command torque based on the result of the judgment made by said tight-cornering judgment means; wherein when said wheel speed signals detected by said wheel speed detection means involve an abnormality, the tight-cornering judgment means is prevented from making judgment.

7. A torque distribution control device as set forth in claim 6, wherein when said wheel speed signals detected by said wheel speed detection means involve an abnormality, said command torque calculation means calculates said command torque by using throttle opening degree data representing throttle opening degree of said engine, without using said wheel speed data relating to said wheel speed signals.

8. A torque distribution control device as set forth in claim 6, wherein when said wheel speed signals detected by said wheel speed detection means involve an abnormality, said command torque calculation means calculates said command torque by using a predetermined fixed value without using said wheel speed data relating to said wheel speed signals.

9. A torque distribution control device for a four-wheel drive vehicle having a torque distribution device for distributing the drive power transmitted from an engine to prime drive wheels, to sub-drive wheels and being capable of continuing four-wheel drive even when an abnormality occurs with the wheel speed signal of any one wheel within four front and rear wheels, said control device comprising front-rear wheel speed difference operation means for obtaining the wheel speed difference between said front wheels and said rear wheels from wheel speed signals which remain normal even in an abnormal state; tight-cornering judgment prohibition means for prohibiting a judgment of a tight-cornering braking phenomenon, which judgment is made for preventing said tight-cornering braking phenomenon from occurring, when said wheel speed difference between said front wheels and said rear wheels obtained by said front-rear wheel speed difference operation means is larger than a threshold value as the reference of slip judgment; and abnormal-state tight-cornering judgment means for altering a tight-cornering judgment for a normal-state to a tight-cornering judgment for an abnormal state which latter judgment is made based on said wheel speed signals of two inside and outside wheels of either said front wheels or said rear wheels which are both normal, when said front-rear wheel speed difference is smaller than said threshold value.

* * * * *